United States Patent
Peeters et al.

(10) Patent No.: US 10,400,111 B2
(45) Date of Patent: Sep. 3, 2019

(54) RADIATION CURABLE AQUEOUS COATING COMPOSITIONS

(75) Inventors: Stephan Peeters, Heverlee (BE); Philippe De Micheli, Montigny-le-Tilleul (BE); Edmund Urbano, Graz (AT); Michel Tielemans, Wemmel (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 585 days.

(21) Appl. No.: 13/581,906

(22) PCT Filed: Mar. 4, 2011

(86) PCT No.: PCT/EP2011/053300
§ 371 (c)(1),
(2), (4) Date: Aug. 30, 2012

(87) PCT Pub. No.: WO2011/110495
PCT Pub. Date: Sep. 15, 2011

(65) Prior Publication Data
US 2012/0328795 A1     Dec. 27, 2012

(30) Foreign Application Priority Data
Mar. 12, 2010 (EP) .................................. 10156411

(51) Int. Cl.
| | |
|---|---|
| *C09D 4/06* | (2006.01) |
| *C08G 18/68* | (2006.01) |
| *C08G 18/81* | (2006.01) |
| *C08G 63/47* | (2006.01) |
| *C09D 11/101* | (2014.01) |
| *C09D 133/14* | (2006.01) |
| *C09D 135/00* | (2006.01) |
| *C09D 167/07* | (2006.01) |
| *C09D 175/14* | (2006.01) |
| *C09J 167/07* | (2006.01) |

(52) U.S. Cl.
CPC ............. *C09D 4/06* (2013.01); *C08G 18/683* (2013.01); *C08G 18/8175* (2013.01); *C08G 63/47* (2013.01); *C09D 11/101* (2013.01); *C09D 133/14* (2013.01); *C09D 135/00* (2013.01); *C09D 167/07* (2013.01); *C09D 175/14* (2013.01); *C09J 167/07* (2013.01)

(58) Field of Classification Search
CPC .... C09D 175/14; C09D 11/00; C09D 167/06; C09D 163/10; C09D 4/06; C09D 11/101; C09D 133/14; C09D 135/00; C09D 167/07; B05D 5/10; B05D 7/24; B05D 3/06; C09J 167/06; C08G 18/683; C08G 18/8175; C08G 63/47
USPC ................... 427/487; 523/400; 524/513, 507
See application file for complete search history.

(56) References Cited

U.S. PATENT DOCUMENTS

| | | | |
|---|---|---|---|
| 3,306,866 A | | 2/1967 | Percival et al. |
| 3,979,346 A | | 9/1976 | Zuckert et al. |
| 4,133,786 A | | 1/1979 | Harris et al. |
| 4,585,828 A | | 4/1986 | Meixner et al. |
| 5,006,598 A | | 4/1991 | Adams et al. |
| 5,087,643 A | | 2/1992 | Truong |
| 5,304,612 A | | 4/1994 | Umetani et al. |
| 5,362,773 A | * | 11/1994 | Brindoepke .......... C08F 299/00 523/415 |
| 5,548,005 A | | 8/1996 | Kurth et al. |
| 5,707,939 A | * | 1/1998 | Patel ........................ C09K 8/36 507/127 |
| 6,166,150 A | | 12/2000 | Wilke et al. |
| 6,262,149 B1 | | 7/2001 | Clark et al. |
| 6,627,700 B1 | | 9/2003 | Kadambande et al. |
| 7,605,209 B2 | | 10/2009 | Killilea et al. |
| 2002/0077410 A1 | | 6/2002 | Harakawa et al. |
| 2004/0013895 A1 | | 1/2004 | Dean et al. |

(Continued)

FOREIGN PATENT DOCUMENTS

| | | |
|---|---|---|
| EP | 0 140 323 | 6/1987 |
| EP | 1 792 956 | 7/2008 |

(Continued)

OTHER PUBLICATIONS

English abstract of He et al. "Synthesis of Dipentaerythritol Hexaacrylate" Applied Chemical Industry (2003) Issue 4, pp. 40-41.*
International Search Report dated Apr. 6, 2011 in International (PCT) Application No. PCT/EP2011/053300, of which the present application is the national stage.
J. Odeberg, Journal of Applied Polymer Science, vol. 62, 435-445, 1996.

*Primary Examiner* — Robert S Walters, Jr.
(74) *Attorney, Agent, or Firm* — Wenderoth, Lind & Ponack, L.L.P.

(57) ABSTRACT

This invention relates to a radiation curable aqueous coating composition comprising: —from 1 to 99% by weight, relative to the total weight of (1) and (2), of at least one radiation curable aqueously dispersed polyester resin composition (1) comprising an emulsifier D and the reaction product AC of a hydroxy functional polyester resin A and an olefinically unsaturated compound C which can be radically polymerized and which is attached to the polyester resin backbone by an ester linkage or a urethane linkage, and—from 1 to 99% by weight, relative to the total weight of (1) and (2), of at least one other olefinically unsaturated compound (2) selected from the group of: water-dispersible compounds (21); water-soluble compounds (22); and/or water-compatible compounds (23) that have a weight average molecular weight of at least 450 Dalton and are different from the reaction product AC.

28 Claims, No Drawings

(56) References Cited

U.S. PATENT DOCUMENTS

| | | |
|---|---|---|
| 2007/0082967 A1 | 4/2007 | James et al. |
| 2007/0167603 A1 | 7/2007 | Urbano et al. |
| 2007/0299228 A1 | 12/2007 | McNamee et al. |
| 2011/0028636 A1 | 2/2011 | Hobisch et al. |
| 2011/0217478 A1* | 9/2011 | De Waele ............ C09D 11/101 427/500 |
| 2014/0107277 A1 | 4/2014 | Hobisch et al. |
| 2015/0240039 A1* | 8/2015 | Katsuda ................ H01G 11/52 429/214 |

FOREIGN PATENT DOCUMENTS

| | | |
|---|---|---|
| EP | 2 110 410 | 10/2009 |
| EP | 2 143 748 | 1/2010 |
| EP | 2 175 000 | 4/2010 |
| JP | 50-79558 | 6/1975 |
| JP | 52-21033 | 2/1977 |
| JP | 55-139463 | 10/1980 |
| JP | 60-063263 | 4/1985 |
| JP | 60-112822 | 6/1985 |
| JP | 61-287918 | 12/1986 |
| JP | 2001-501995 | 2/2001 |
| JP | 2002-105144 | 4/2002 |
| JP | 2002-285046 | 10/2002 |
| JP | 2006-307174 | 11/2006 |
| JP | 2007-510792 | 4/2007 |
| JP | 2011-521016 | 7/2011 |
| WO | 94/28043 | 12/1994 |
| WO | 03/087244 | 10/2003 |
| WO | 04/009716 | 1/2004 |
| WO | 2004/035696 | 4/2004 |
| WO | 2005/047396 | 5/2005 |
| WO | 2009/115489 | 9/2009 |

* cited by examiner

RADIATION CURABLE AQUEOUS COATING COMPOSITIONS

FIELD OF THE INVENTION

This invention relates to radiation curable aqueous coating compositions which can be applied to a variety of substrates, and provide these substrates with coating films having good mechanical and chemical resistance. The invention further relates to a process for preparing such coating compositions and to their uses.

BACKGROUND OF THE INVENTION

Polyester resins, and among these particularly alkyd resins are one of the most common binder class used for ambient-cure, solvent-based coatings. The resistance properties of traditional solvent-borne alkyd resins are developed via autooxydative crosslinking of the paint film when subjected to air. Crosslinking occurs when the activated methylene groups in the unsaturated fatty acids or oils of the alkyd are oxidised in air to the corresponding hydroperoxides which subsequently decompose to generate free radicals, thus resulting in an oxidative crosslinking process. This oxidative crosslinking process is usually accelerated by adding the so-called driers, such as, for example, various salts of cobalt, zirconium, calcium, and manganese. However, alkyd resins have relatively slow "dry" or cure times, particularly at ambient temperatures. Various modifications have been made to alkyd resins to address such concerns.

One such attempt includes modification of a polyester resin or an alkyd resin with a vinyl or acrylic polymer, based on monomers such as styrene or methyl methacrylate, via a free radical polymerisation of these monomers in the presence of the alkyd resin, to produce a vinyl-alkyd copolymer or a so-called "vinylated alkyd" or "vinylated polyester".

Vinylated alkyd resins generally have a higher molar mass and a higher glass transition temperature (Tg), leading to coatings with reduced tack-free time. However, the so-called "through-dry time" (complete oxidation of unsaturation in the fatty acids forming the alkyd part of the modified resin) of such coatings is longer than in non-modified alkyds due to the decreased degree of unsaturation in the alkyd as a result of copolymerisation with the vinyl monomers. An additional drawback is that paint formulations containing vinylated alkyd resins require greater amounts of solvent, due to the increased molar mass and Tg of the vinylated alkyd.

Water-borne alkyd resins are applied in the form of aqueous emulsions or dispersions, and only need small quantities of coalescing additives. Evaporation of water and oxidative drying of the alkyd, however, occur on the same time scale as in solvent-borne alkyds. While other resin systems allow faster curing, the favourable properties of alkyd resins particularly on wood substrates, such as wood wetting ("Anfeuerung"), make the use of alkyds in this application field highly desirable.

PCT/EP2009/063151 provides a modified polyester or alkyd resin made by reaction of a hydroxy functional polyester or alkyd resin with an olefinically unsaturated compound having reactive groups which are reactive towards hydroxyl groups in the said polyester or alkyd resin, and by dispersing this modified polyester or alkyd resin in an aqueous medium using an emulsifier which is compatible with the said modified polyester or alkyd resin, to form a radiation-curable composition which can be radically polymerised following irradiation with high-energy radiation such as ultraviolet light or electron beams. PCT/EP2009/063151 is incorporated herein by reference, in particular with respect to the patent claims.

It has now been found that it is highly advantageous to add to the radiation curable aqueously dispersed polyester resin composition (1) based on polyester resins or alkyd resins having olefinic unsaturation as described in PCT/EP2009/063151 at least one other olefinically unsaturated compound (2) selected from the group of: water-dispersible compounds (21); water-soluble compounds (22); and/or water-compatible compounds (23), wherein said water-compatible compounds (23) have a weight average molecular weight of at least 450 Dalton and are different from the reaction product AC.

SUMMARY OF THE INVENTION

The invention therefore provides a radiation curable aqueous coating composition comprising:
from 1 to 99% by weight, relative to the total weight of (1) and (2), of at least one radiation curable aqueously dispersed polyester resin composition (1) comprising an emulsifier D and the reaction product AC of a hydroxy functional polyester resin A and an olefinically unsaturated compound C which can be radically polymerised and which is attached to the polyester resin backbone by an ester linkage or a urethane linkage, and
from 1 to 99% by weight, relative to the total weight of (1) and (2), of at least one other olefinically unsaturated compound (2) selected from the group of: water-dispersible compounds (21); water-soluble compounds (22); and/or water-compatible compounds (23), wherein said water-compatible compounds (23) have a weight average molecular weight of at least 450 Dalton and are different from the reaction product AC.

The invention also provides a radiation curable aqueous composition comprising:
from 1 to 99% by weight, relative to the total weight of (1) and (2), of at least one radiation curable aqueously dispersed polyester or alkyd resin composition (1) comprising an emulsifier D and the reaction product AC of a hydroxy functional polyester or alkyd resin A and an olefinically unsaturated compound C which can be radically polymerised and which is attached to the polyester or alkyd resin backbone by an ester linkage or a urethane linkage, which composition (1) additionally contains an olefinically unsaturated compound B which can be radically polymerised, wherein the radical polymerisation is initiated by the action of radiation, or possibly by the action of radiation and air, and
from 1 to 99% by weight, relative to the total weight of (1) and (2), of at least one other olefinically unsaturated compound (2) selected from the group of: water-dispersible compounds (21); water-soluble compounds (22); and/or water-compatible compounds (23), wherein said water-compatible compounds (23) have a weight average molecular weight of at least 450 Dalton and are different from the reaction product AC.

The invention also provides a process for the preparation of such coating compositions. There exist different preferred ways of adding the olefinically unsaturated compound (2) depending on the compound's nature.

In a preferred embodiment of the invention, at least one olefinically unsaturated compound (2) according to the invention is simply mixed (or blended) with an aqueously dispersed polyester or alkyd resin composition (1) as described above.

In the same or a different preferred embodiment, at least one olefinically unsaturated compound (2) according to the invention is present in the polyester or alkyd resin composition (1) as described above. In a preferred embodiment this compound (2), which advantageously is a water-compatible olefinically unsaturated compound (23) according to the invention, is added to the reaction product AC (and where present B) prior to dispersion in water, preferably prior to adding of the emulsifier D.

DETAILED DESCRIPTION OF THE PREFERRED EMBODIMENTS

In the (any) coating composition of the invention, the polyester or alkyd resin A is preferably an esterification product of a fatty acid A1 having from 8 to 30 carbon atoms, a polyhydric aliphatic alcohol A3 having at least three hydroxyl groups, and an aromatic, cycloaliphatic or linear or branched aliphatic carboxylic acid A4 having at least two carboxyl groups, or the anhydride thereof, and optionally an aliphatic or aromatic monocarboxylic acid A2 having at least two carbon atoms and not more than seven carbon atoms. According to a specific embodiment of the invention, the polyester A comprises at least one olefinic unsaturation in the backbone. This olefinic unsaturation can be introduced by using an unsaturated fatty acid A1, and/or by adding one or more oils A5 containing at least one olefinic unsaturation in the backbone. The presence of oils A5 is preferred, which oil particularly preferably has at least one olefinic unsaturation in the backbone.

The fatty acids A1 are preferably linear or branched aliphatic monocarboxylic acids, and preferably have from 8 to 24 carbon atoms, and may also have olefinic unsaturation. Useful acids are, i.a., caprylic acid, pelargonic acid, capric acid, lauric acid, myristic acid, palmitic acid, stearic acid, and behenic acid, and also unsaturated fatty acids such as linolic acid, linolenic acid, eleostearic acid, oleic acid, ricinoleic acid, palmitoleic acid, gadoleic acid, and arachidonic acid, to name only a few. They may be used alone, or preferably, in mixture. Mixtures of fatty acids from natural sources may also be used, such as cotton oil fatty acid, coconut oil fatty acid, and sunflower oil fatty acid.

The aliphatic or aromatic monocarboxylic acid A2 having at least two carbon atoms and not more than seven carbon atoms which may optionally be used in the synthesis of the alkyd resin, are aliphatic linear or branched, or aromatic acids, such as butyric acid, isobutyric acid, 2,2-dimethylpentanoic acid, valeric acid, caproic acid, heptanoic acid, and preferably, benzoic acid.

The polyhydric aliphatic alcohols A3 have at least three hydroxyl groups, and preferably from three to ten carbon atoms. They may be linear or branched, and may preferably be one or more of glycerol, threitol, erythritol, sorbitol, mannitol, trimethylol ethane, trimethylol propane, pentaerythritol, ditrimethylol ethane, ditrimethylol propane, and dipentaerythritol. The aromatic, cycloaliphatic or linear or branched aliphatic carboxylic acids A4 having at least two carboxyl groups preferably have at least four carbon atoms, or at least eight carbon atoms if they are aromatic, and are preferably one or more of glutaric acid, adipic acid, pimelic acid, suberic acid, sebacic acid, and the so-called dimeric fatty acid synthesised from unsaturated fatty acid by a dimerisation process. Aliphatic cyclic diacids may be the isomers of cyclopentane dicarboxylic acid, cyclohexane dicarboxylic acid (such as hexahydrophthalic acid, hexahydroterephthalic acid, and tetrahydrophthalic acid), aromatic diacids may be phthalic, isophthalic, and terephthalic acids, 4,4'-diphenyl dicarboxylic acid, and also higher functional acids, such as trimellitic acid and benzophenonetetracarboxylic acid. Where intramolecular anhydrides of these acids exist, they may, of course, also be used in the synthesis.

The optional oils A5 are esters of glycerol with fatty acids which preferably have at least one olefinic unsaturation, or two or more of these in their backbone. Preferably these oils are polyunsaturated oils, such as linseed oil, sunflower oil, perilla oil, or hempseed oil. Polyester or alkyd resins containing one or more olefinic unsaturation moieties, for example derived from such at least monounsaturated oils, and preferably, polyunsaturated oils, lead to coating binders which can be used for dual cure systems, i.e. radical polymerisation induced by both irradiation, and air-drying.

In any of the embodiments of the invention, the polyester or alkyd resins A are preferably prepared in a reaction where all components, the fatty acid A1, the optional aliphatic or aromatic monocarboxylic acid A2, the polyhydric alcohol A3, and the di- or polycarboxylic acid A4, and optionally, the oil A5, are charged into a reaction vessel and heated to a temperature of at least 100° C., preferably in the presence of an azeotrope former which forms an azeotrope with water generated in the polycondensation reaction, separation of the water formed, or distillation of the mixture of water and the azeotrope former, separation of water from the liquid mixture of the distillate which forms two phases upon condensation, and returning the azeotrope former into the reaction vessel. It is also possible to use two or more different compounds of at least one of the components A1 through A5 in the synthesis of the alkyd resin A. In another preferred embodiment, it is also possible to start the synthesis of the alkyd resin A by using an oil as an educt (starting material), which is an ester of glycerol (which belongs to the group of A3), and fatty acids which may be the same or different, and belong to the group of A1. Useful oils include linseed oil, soybean oil, cotton seed oil, coconut oil, sunflower oil, rapeseed oil, and safflower oil.

In a preferred embodiment of the invention, olefinically unsaturated compounds B are also present in the radiation curable aqueously dispersed alkyd resin composition (1), which olefinically unsaturated compounds B can be radically polymerised following irradiation with high-energy radiation such as ultraviolet light or electron beams. Compounds B are different from compounds (2), more in particular from compounds (23). Typically compounds B are different from compounds AC.

The olefinically unsaturated compound B which can be radically polymerised is preferably a reaction product of a polyol B1 and an olefinically unsaturated compound C which can be radically polymerised. Such compounds B are preferably esters of polyols B1 having at least two carbon atoms with compounds C selected from the same group as C1 infra, viz., olefinically unsaturated acids, preferably (meth)acrylic acid, such as glycerol tri(meth)acrylate or hexanediol di(meth)acrylate. Preferably, the polyols B1 are selected from the same group as the compounds A3 supra, where an additional modification consists in using reaction products of the polyols A3 with ethylene oxide and/or propylene oxide to yield ethoxylated or propoxylated or mixed alkoxylated polyols. C may also be selected from hydroxy functional olefinically unsaturated compounds, leading to, e. g., (meth)allyl ethers of the mentioned polyols B1. In a preferred embodiment, the compounds B themselves are not water-reducible, but form solutions, dispersions or emulsions in water or aqueous solutions in the presence of an emulsifier D as described infra. While basically, any emulsifier can be used which is compatible with the modified alkyd resin AC (and where present B), the emulsifier D in general is an organic emulsifier, more preferably a polymeric organic emulsifier.

In the context of the present invention, a compound X or a mixture X' of compounds are called "water-reducible" if they form aqueous solutions, aqueous emulsions or aqueous dispersions after preparing a homogeneous mixture, having a mass fraction of X or of X' in the solution, emulsion or dispersion of at least 10%, and do not show phase separation upon storage at 20° C. and at least 24 hours after the preparation of the mixture.

Compound B can be added to the reaction product AC in any stage, during or after its preparation. In a preferred embodiment of the invention, compound B is prepared in situ by reacting compound B1 with compound C during the reaction of alkyd resin A with compound C.

The olefinically unsaturated compound C may be attached to the alkyd resin backbone by an ester bond, in which case the olefinically unsaturated compound C is an unsaturated acid C1 selected from the group consisting of alpha, beta-unsaturated aliphatic monocarboxylic acids, and monoesters of olefinically unsaturated aliphatic dicarboxylic acids. Useful compounds C1 are particularly olefinically unsaturated linear or branched aliphatic carboxylic acids having from 3 to 15 carbon atoms, such as acrylic and methacrylic acids, and their higher homologues such as ethacrylic acid, vinylacetic acid, crotonic, and isocrotonic acids. Other useful compounds are monoalkyl esters of olefinically unsaturated dicarboxylic acids, such as monomethyl or monoethyl maleate.

Another possibility is attaching the unsaturated compound via a urethane bond, for example, an isocyanate functional olefinically unsaturated compound C2 can be reacted with an alkyd resin A by addition to its hydroxyl groups, under formation of a urethane group. In this embodiment, the olefinically unsaturated compound C used is an isocyanate-functional reaction product C2. C2 can be the reaction product of an unsaturated aliphatic hydroxy-functional compound C21 and a diisocyanate or polyfunctional isocyanate C22 having three or more isocyanate groups per molecule. In this case, it is preferred to use compounds C21 containing an average of more than one double bound to make compounds C2, containing an average of more than one double bound.

Alternatively, the alkyd resin A can be first reacted with a diisocyanate or a polyfunctional isocyanate C22 and then be further reacted with compound C21.

This latter possibility where modification of the hydroxy functional alkyd resin is effected by reaction with compounds C2 involves multi-step reactions, while the direct esterification described in the first embodiment using compound C1 involves only one step for functionalisation.

While basically, any emulsifier can be used which is compatible with the modified alkyd resin AC (and where present B), it is generally preferred to use an emulsifier D which comprises moieties of a monoalkoxy polyalkylene glyol. An example of a preferred emulsifier D is one which is the polyesterification product of a fatty acid D1, a polyhydric alcohol D2 having at least three hydroxyl groups per molecule, a di- or polycarboxylic acid D3 or its anhydride, more preferably a cycloaliphatic di- or polycarboxylic acid D3 or its anhydride, and a monoalkoxy polyalkylene glycol D4.

The fatty acids D1 are preferably unsaturated or saturated fatty acids having from 10 to 22 carbon atoms. According to a preferred embodiment, the fatty acid D1 is selected from unsaturated fatty acids D11 having an iodine number of at least 100 cg/g, preferably from 120 cg/g to 200 cg/g, in which isolated and conjugated double bonds may be present. These are obtained, for example, from vegetable oils such as soybean oil, from fish oil, from sunflower oil, linseed oil, safflower oil, and cottonseed oil by hydrolysis, or originate from the distillation of tall oil. Fatty acids with conjugated double bonds which are also useful for the purposes of this invention are obtained by catalytic isomerisation of natural fatty acids or from dehydrated castor oil (ricinene fatty acid).

In addition, it is also possible, in whole or in part, to use saturated fatty acids D12 having from ten to twenty-two carbon atoms. Suitable examples include lauric acid, palmitic acid, and stearic acid.

The polyhydric alcohols D2 having at least three hydroxyl groups per molecule, are linear or branched or cyclic aliphatic compounds having at least three carbon atoms per molecule. Other than glycerol, erythritol, threitol, pentaerythritol, trimethylolpropane and trimethylol ethane, and compounds derived from these such as dipentaerythritol, ditrimethylolpropane and ditrimethylol ethane, the so-called "sugar alcohols are particularly preferred, such as the hexitols ($C_6$ sugar alcohols), which may be partly or even wholly replaced by pentitols ($C_5$ sugar alcohols). Among the hexitols, preference is given to the use of sorbitol, mannitol and dulcitol, and among the pentitols, to the use of arabitol and xylitol, and also mixtures thereof. The carboxylic acid D3 is preferably a cycloaliphatic carboxylic acid D3, more preferably having at least two carboxylic acid groups, and is particularly preferably a saturated or partly unsaturated acid having from 6 to 12, especially preferred from 8 to 10, carbon atoms, such as hexahydrophthalic acid, tetrahydrophthalic acid and its alkyl derivatives, e.g., methyltetrahydrophthalic acid, which acids are used preferably in the form of their anhydrides. It is likewise possible to use cyclohexane-1,3- and -1,4-dicarboxylic acid and the dicarboxylic acids derived from polycyclic, especially bicyclic hydrocarbons, or the anhydrides of these acids, such as, for example, bicyclo[2.2.2]oct-5-ene-2,3-dicarboxylic anhydride. Surprisingly, fumaric acid, succinic anhydride and maleic anhydride, and also aromatic dicarboxylic acids such as phthalic acid, isophthalic acid and terephthalic acid, for example, have not proven suitable; they result in a higher hydrolysis rate and poorer stability of the alkyd resin emulsions.

The monoalkoxy polyalkylene glycol D4 has 1 to 8, preferably 1 to 4, carbon atoms in the alkoxy radical and preferably, a number-average molar mass of from 500 g/mol to 2000 g/mol, particularly preferably from 600 g/mol to 1800 g/mol. Up to 20% of the oxyethylene units may also be replaced by oxypropylene units. Particular preference is given to methoxy-, ethoxy- and n-butoxy-polyethylene glycols having a number-average molar mass of from 600 g/mol to 1800 g/mol.

The emulsifier D is obtainable by reacting, under polycondensation conditions, the components D1, D2, D3, and D4, preferably in an analogous way to the preparation of the alkyd resin A as described supra.

It is additionally possible in the mixture of starting materials to use monocarboxylic acids D5 which are different from the fatty acids D1, such as aliphatic linear or branched monocarboxylic acids having up to nine carbon atoms, such as 2-ethyl hexanoic acid, or aromatic monocarboxylic acids such as benzoic acid, the isomers of toluic acid, phenylacetic acid, and the isomers of tolylacetic acid.

To prepare the emulsifier resins D it is preferred to use the following mass fractions in the mixture of starting materials:

from 10% to 40%, preferably from 15% to 35%, of the polyhydroxyl component D2, from 35% to 70%, preferably from 40% to 60%, of the alkoxypolyethylene glycol D4, from 10% to 30%, preferably from 15% to 25%, of the cycloaliphatic di- or polycarboxylic acid D3, from 15% to 40%, preferably from 20% to 35%, of the fatty acid D1, and from 0% to 15%, preferably from 3% to 10%, of another monocarboxylic acid D5 which is different from D1.

The polycondensation takes place preferably up to an acid number of the polycondensate D of less than 10 mg/g, the solution of D in water having a mass fraction of solids of from 30% to 60% and a dynamic viscosity of from 5000 mPa·s to 50 000 mPa·s. The acid number of the emulsifier D is particularly preferably less than 5 mg/g. A higher acid number can be adjusted to this preferred range by reaction of the polycondensate D with an epoxide, such as an ester of glycidol with an alkanoic acid, preferably, a glycidyl ester of a branched aliphatic acid having from 5 to 12 carbon atoms, such as neopentanoic, 2-ethylhexanoic, or neodecanoic acid.

It is also possible to use an oil in the synthesis of the emulsifier D as an educt (starting material), which is an ester of glycerol (which belongs to the group of D2), and fatty acids which may be the same or different, and belong to the group of D1. Useful oils include linseed oil, soybean oil, cotton seed oil, coconut oil, sunflower oil, rapeseed oil, and safflower oil.

Another example of preferred emulsifiers D for use in the present invention are polyalkylene based emulsifiers, such as polyethylene oxide/polypropylene oxide block copolymers, polyalkylene glycol ethers and/or alkyl polyalkylenes. Optionally such emulsifiers are used together with a co-solvent that preferentially is chosen from oxygen containing types such as dipropylene glycol methyl ether (Dowanol™ DPM*) and/or diethylene glycol methyl ether (Dowanol™ DM*) (*available from Dow Chemical Company). Dispersion stability increased therewith.

The radiation curable aqueously dispersed polyester or alkyd resin composition (1) of the invention in a more general way is obtained by adding to a hydroxy functional polyester or alkyd resin A an olefinically unsaturated compound C, which compound C has functional groups which react with the hydroxyl groups of A, reacting A and C, and dispersing the reaction product AC of A and C in the presence of an emulsifier D in water to form a homogeneous mixture.

The reaction product AC of a hydroxy functional alkyd resin A and an olefinically unsaturated compound C which can be radically polymerised and which is attached to the alkyd resin backbone by an ester linkage or a urethane linkage can be prepared by the following process:

If a compound according to the group of compounds C1 is used, the alkyd resin A is mixed with an esterification catalyst, and preferably, also a polymerisation inhibitor to avoid premature polymerisation of compound C1. This mixture is heated to a temperature of preferably from 70° C. to 110° C., homogenised, and lean air with an oxygen content of from 3% to 10% is bubbled though this composition. Compound C1 is then added, preferably in stoichiometric excess, while maintaining the lean air stream, and the reaction mass is heated to preferably from 115° C. to 145° C. The esterification reaction is preferably accelerated by removing the water formed in the condensation reaction by azeotropic distillation, and the reaction is continued until the acid number of the reaction mass which is monitored during the reaction indicates conversion of more than 90% of the hydroxyl groups in the alkyd resin. The azeotrope former and the excess of compound C1 are then removed, by distillation under reduced pressure, and the modified alkyd resin is isolated.

If a compound according to C2 is used, in a first step, the isocyanate functional olefinically unsaturated compound C2 is prepared from an unsaturated aliphatic alcohol C21 and a diisocyanate or polyfunctional isocyanate C22 having three or more isocyanate groups per molecule, and this compound C2 is then reacted with the alkyd resin under formation of a urethane bond by addition to its hydroxyl groups, under formation of a urethane group. Alternatively, in the first step, the alkyd resin A can be reacted with compound C22, and then this reaction product is further reacted with compound C21.

If a compound according to B, in a further preferred embodiment, is also present in the polyester resin composition (1), its precursor B1, the polyol, is preferably mixed with the alkyd resin A prior to reaction thereof with C, in which case a reaction product of A with C and a reaction product of B1 with C are formed concurrently. It is also possible to react the polyol B1 with a compound of class C which is the same as, or different from, the compound of class C which is to be used to modify the alkyd resin A. In this case, the reaction product B is formed separately, and this reaction product B is then admixed to A before reaction thereof with C, or the reaction product B is mixed with the reaction product AC of A and C. The modified alkyd resin AC (or the mixture of AC and B) is then admixed to the emulsifier D, preferably at elevated temperature of from 40° C. to 80° C., and well homogenised, and then dispersed in water, or, preferably, water is added in one or more portions to the well homogenised heated (from 40° C. to 80° C. as stated supra) mixture of the emulsifier D and the modified alkyd resin AC (or the mixture of AC and B).

More in particular, the radiation curable aqueously dispersed polyester or alkyd resin composition (1) may be obtained by:

a) mixing in a reaction vessel a fatty acid A1 having from 8 to 24 carbon atoms, a polyhydric aliphatic alcohol A3 having at least three hydroxyl groups, and an aromatic, cycloaliphatic or linear or branched aliphatic carboxylic acid A4 having at least two carboxyl groups, or the anhydride thereof, and optionally, an aliphatic or aromatic monocarboxylic acid A2 having at least two carbon atoms and not more than seven carbon atoms, and optionally, an oil A5 which is preferably an unsaturated oil, wherein the amounts and kinds of the educts are chosen in a way to ensure a stoichiometric excess of hydroxyl groups in the mixture of educts, b) heating the mixture thus obtained to a temperature of from 140° C. to 250° C. under removal of water, to provide a hydroxy functional polyester resin A, c) adding an olefinically unsaturated compound C that is reactive with hydroxyl groups of A under formation of a chemical bond of a group which is an ester group or a urethane group, and heating the mixture of A and C to effect a reaction and formation of the said chemical bonds, d) adding the reaction product of step c) to an emulsifier D under stirring until a homogeneous mixture is obtained, and e) adding water in one or more portions under stirring to the mixture of step d), and adjusting to a mass fraction of solids of from 45% to 75%, to obtain a stable emulsion. The polyester resin A of step a) may be mixed with a polyol B1 before reaction of step c) with the olefinically unsaturated compound C.

Preferably the radiation curable aqueously dispersed polyester or alkyd resin composition (1) comprises, relative to the total weight of AC, B and D: from 70 to 97%, more preferably from 80 to 95%, by weight of AC (or AC and B), and from 3 to 30%, more preferably from 5 to 20%, by weight of the emulsifier D.

Where compounds B are present, the molar mass ratio of AC to B in the polyester or alkyd resin composition (1) preferably ranges from 95:5 to 50:50, more preferably from 75:25 to 65:35.

Provided in the present invention are radiation curable aqueous coating compositions comprising:

from 1 to 99% by weight, relative to the total weight of (1) and (2), of at least one radiation curable aqueously dispersed polyester resin composition (1) comprising an emulsifier D and the reaction product AC of a hydroxy functional polyester resin A and an olefinically unsaturated compound C which can be radically polymerised and which is attached to the polyester resin backbone by an ester linkage or a urethane linkage, which composition (1), optionally, may additionally contain at least one olefinically unsaturated compound B which can be radically polymerized, and from 1 to 99% by weight, relative to the total weight of (1) and (2), of at least one other olefinically unsaturated compound (2) selected from the group of: water-dispersible compounds (21); water-soluble compounds (22); and/or water-compatible compounds (23) that have a weight average molecular weight of at least 450 Dalton and are different from the reaction product AC.

By "a water-dispersible compound" is meant to designate in the present invention an olefinically unsaturated compound (2) that itself is capable of being dispersed or emulsified into water (i.e., without requiring the use of a separate emulsifier) or water can be added to the compound to form a stable dispersion (i.e., the dispersion should have at least 24 hours, preferably at least one month shelf stability at 20° C.). The term "dispersion" as understood herein refers to a two-phase system of small particles or droplets in water.

By "a water-soluble compound" is meant to designate in the present invention an olefinically unsaturated compound (2) that permits to form a homogeneous, single phase mixture when the compound is mixed with water over a concentration range of 5 to 95 weight % of water in the total mass of water and the compound (2).

To facilitate water-dispersibility or water-solubility, anionic stabilizing groups, cationic stabilizing groups and/or non-ionic stabilizing groups as well known are introduced into the backbone of the olefinically unsaturated compound (2).

By "a water-compatible compound" is meant to designate in the present invention an olefinically unsaturated compound (2) that in itself is not water-reducible, but forms dispersions or emulsions in water or aqueous solutions in the presence of a suitable emulsifier E, which may be same as the emulsifier D, but may also be different therefrom. The external emulsifier E may be an anionic, cationic and/or non-ionic emulsifier depending on the case. In general the olefinically unsaturated compounds (2) of the present invention—whether water-dispersible, water-soluble and/or water-compatible—have a weight average molecular weight (Mw) of at least 450 Dalton as determined by Gel Permeation Chromatography (GPC). The olefinically unsaturated compounds (2) of the present invention preferably have a Mw of at least 470 Dalton, more preferably at least 500 Dalton. Generally, the Mw is at most 10000 Dalton, preferably at most 5000 Dalton. Most typically the olefinically unsaturated compounds (2) of the invention have a Mw of between 1000 and 2000 Dalton. The olefinically unsaturated compounds (2) of the present invention in general are oligomers or polymers.

Weight average molecular weights (Mw) and number average molecular weights (Mn) typically are measured by GPC, with samples being dissolved in THF, on a 3×PLgel 5 µm Mixed-D LS 300×7.5 mm column MW range 162 to 377400 g/mol calibrated with polystyrenes standards, at 40° C.

Preferred compounds (2) are selected from one or more of the following: olefinically unsaturated (poly)urethanes, epoxies, acrylics, (poly)esters, polyethers, partially esterified styrene/maleic anhydride copolymers, and mixtures or copolymers thereof. By "(poly)urethane" is meant to designate in the present invention both urethanes and polyurethane as well as derivatives thereof or mixtures thereof. By "(poly)ester" is meant to designate in the present invention both mono-esters and polyesters as well as derivatives thereof or mixtures thereof. Olefinically unsaturated (poly)esters of the invention, especially those of the water-compatible type, advantageously are different from the specific esters of polyols B1 with compounds C as described above.

By "olefinic unsaturation" as used in the present invention is meant to designate allylic or (meth)acrylic unsaturation. Preferred are compounds that have (meth)acrylate functionality. By "(meth)acrylate" is meant to designate in the present invention both acrylate and methacrylate as well as derivatives thereof or mixtures thereof.

Accordingly, compounds (2) of the present invention are preferably selected from one or more of the following: (poly)urethane (meth)acrylates, epoxy (meth)acrylates, polyether (meth)acrylates, (meth)acrylic (meth)acrylates, (poly)ester (meth)acrylates, styrene/maleic anhydride copolymers partially esterified with hydroxy alkyl (meth)acrylates, and mixtures or copolymers thereof. Most preferred are the acrylated forms thereof.

(Poly)ester (meth)acrylates of the invention, especially those of the water-compatible type, advantageously are different from the specific esters of polyols B1 with compounds C as described above.

(Poly)ester (meth)acrylates of the invention, especially those of the water-compatible type, often have a Mw of at least 470 Dalton, preferably at least 500 Dalton, especially at least 600 Dalton, or even at least 800 Dalton, as determined by GPC.

Below some preferred compounds (2) according to the invention:

Water-dispersible (poly)urethanes (meth)acrylates are known since long and have been widely described (see e.g. U.S. Pat. No. 7,605,209 and WO 2009/115489). The state of the art generally includes anionically, cationically or non-ionically stabilized (poly)urethane (meth)acrylate colloids in water. They are typically prepared by reacting one or more isocyanates (preferably a di-isocyanate or a tri-isocyanate) with one or more (meth)acrylated compounds containing at least one reactive group capable to react with isocyanate groups (such as a hydroxyl group), at least one hydrophilic compound containing at least one reactive group capable to react with isocyanate groups and which is capable to render the (poly)urethane dispersible in aqueous medium either directly or after the reaction with a neutralizing agent to provide a salt, and, optionally a polyol. By hydrophilic group is meant to designate a group that is either ionic, such as for example a carboxylate or sulfonate group, or that becomes ionic after reaction with a neutralizing agent forming a salt, such as a carboxylic acid, sulfonic acid, or an amino group. A suitable polymer composition is typically obtained from the capping or the chain extension of an isocyanate-terminated ionomeric (poly)urethane oligomer with a mono or poly(meth)acrylated molecule containing at least one reactive group capable to react with isocyanate groups, such as a hydroxyl group. Chain extension, if desired, typically is provided by a polyamine compound. In other embodiments, the (poly)urethane oligomer further contains additional poly(meth)acrylated molecules that are not covalently linked to the polymer. A suitable example is provided by the reaction of a diisocyanate (like isophorone diisocyanate), a polyol (selected e.g. between polyesters, polyethers and polycarbonates), a functional polyol (like dimethylolpropionic acid), a poly(meth)acrylate compound (like pentaerythrytol triacrylate), and optionally, a polyamine (like hexamethylene diamine) and an amine (like triethylamine) followed by the subsequent dispersion of the compound in water. These dispersions can be further stabilized with an ionic and/or nonionic tension-active compound (like a polyalkoxylated fatty alcohol). Suitable for use in the composition of the present invention are for example those that have been commercialized under the names of UCECOAT®7155, UCECOAT®7177, UCECOAT®7570, UCECOAT®7571, UCECOAT®7578, UCECOAT®7655, UCECOAT®7674, UCECOAT®7689, UCECOAT®7770, UCECOAT®7772, UCECOAT®7773, UCECOAT®7825 and UCECOAT®7849.

Water-soluble (poly)urethane (meth)acrylates are also known since long and have been described in e.g. WO 2009/115489. They typically are prepared by reacting one or more isocyanates (preferably a diisocyanate or a triiosocyanate) with a polyol and a (meth)acrylated compound containing at least one reactive group capable to react with isocyanate groups, such as a hydroxyl group. The polyol preferably is a polyester polyol that comprises a polyethylene glycol segment and/or at least one pendant hydrophilic group. By hydrophilic group is meant to designate a group that is either ionic, such as for example a carboxylate or sulfonate group, or that becomes ionic after reaction with a neutralizing agent forming a salt, such as a carboxylic acid, sulfonic acid, or an amino group. The polyester polyol is preferable water-soluble. Water-soluble polyester polyols have been described for example in U.S. Pat. No. 5,006,598 and WO 94/28043. Suitable for use in the composition of the present invention are for example those that have been commercialized under the name of UCECOAT06558, UCECOAT06559, EBECRYL®2002 and EBECRYL®2003. Water-compatible (poly)urethane (meth)acrylates are also well known in the art. They can e.g. be prepared by reacting a di- and/or polyisocyanate, such as hexamethylene-diisocyanate, isophorone-diisocyanate, toluene-diisocyanate, with an hydroxyl functional (meth)acrylate. Use can be made exclusively of hydroxyl functional (meth)acrylates such as those mentioned above, but in order to extend the chain, mono- or polyhydroxy alcohols can also be added (such as polyesters, polyethers or polycarbonates containing hydroxyl groups) to provide, respectively, polyester (poly)urethanes, polyether (poly)urethanes, polycarbonate (poly)urethanes containing (meth)acrylic unsaturations. Preferably, the (poly)urethane (meth)acrylates have a number average molecular weight (Mn) of less than 5,000. Suitable for use in the composition of the present invention are for example those that have been commercialized under the names of EBECRYL®1290, EBECRYL®230, EBECRYL®220, EBECRYL®270 and EBECRYL®4883.

Suitable water-dispersible epoxy (meth)acrylates include the polyepoxy (meth)acrylates described in U.S. Pat. No. 5,548,005. These compounds are typically prepared by reacting acrylic acid or methacrylic acid with a hydrophilic polyepoxy that contains lateral polyethylene(propylene) glycol segments. A hydrophilic polyepoxide of this type can be prepared by reacting a polyepoxide with a primary or secondary polyethylene(propylene) glycol monoether amine (such as Jeffamine®), or by reacting an OH-group containing polyepoxide with a diisocyanate and thereafter with a polyethylene(propylene) glycol monoether. Water-compatible epoxy (meth)acrylates are also well known in the art. They can e.g. be obtained from the reaction of (meth)acrylic acid with polyepoxides, i.e. compounds comprising at least two epoxide functions. The polyepoxides are generally chosen from glycidyl ethers of aromatic or aliphatic alcohols, polyols and from cycloaliphatic polyepoxides. Preferred epoxides are diglycidylethers of aromatic and aliphatic diols and cycloaliphatic diepoxides, such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of butanediol. Particularly preferred is diglycidyl ether of bisphenol-A. Also epoxidized unsaturated fatty acid triglycerides or epoxidized novolacs can be used. Examples include epoxidized soya oil tri- and tetraacrylate, epoxidized castor oil triacrylate, epoxidized linseed oil tetra- and pentaacrylate. Suitable for use in the composition of the present invention are for example those that have been commercialized under the names of EBECRYL®600, EBECRYL®605, EBECRYL®6040, EBECRYL®860, EBECRYL®3701, EBECRYL®3608, EBECRYL03702 and EBECRYL®370.

Water-dispersible polyether(meth)acrylates can be prepared by esterification of hydroxyfunctional polyethers with (meth)acrylic acid. Hydroxyfunctional polyethers can be obtained by ring-opening homo- or copolymerization of cyclic ethers such as tetrahydrofuran, ethylene oxide and/or propylene oxide or can be prepared by reacting polyhydroxy alcohols with ethylene and/or propylene oxide.

(Meth)acrylic (meth)acrylates may also be used. They are known since long and have been widely described. They can basically be obtained by blending (meth)acrylic polymer dispersions obtained by emulsion polymerization with poly (meth)acrylated molecules like trimethylolpropane triacrylate and the like (see e.g. U.S. Pat. No. 1,042,520). It is however more desirable to covalently attach the olefinically unsaturated functionality directly to the acrylic polymer in order to provide the best performance. This approach has been used with a multi-step emulsion polymerization resulting a core & shell particle microstructure that has been further grafted for instance by the interfacial reaction of glycidyl methacrylate with the carboxylic acid functionality present on the acrylic polymer like disclosed in J. Odeberg & all, Journal of Applied Polymer Science, Vol. 62, 435-445 (1996). The resulting polymer dispersion is typically stabilized by external anionic and/or nonionic emulsifiers. Another different route that has been widely described consists in the synthesis of the grafted (meth)acrylic polymer in a solvent that can optionally be stripped after the dispersion of said polymer in water. The resulting polymer dispersion is usually stabilized by the anionic charges present on the polymer backbone.

Suitable water-compatible (poly)ester (meth)acrylates may be selected from the reaction products of a polyol and an olefinically unsaturated compound which can be radically polymerised; or from the reaction products of a hydroxyl group-containing polyester backbone with (meth)acrylic acid, or of a carboxyl group-containing polyester backbone with a hydroxyalkyl (meth)acrylate or with glycidyl methacrylate.

Water-compatible (poly)ester (meth)acrylates according to the invention can be the reaction product of a polyol and an olefinically unsaturated compound which can be radically polymerised. Such compounds are preferably esters of polyols having at least two carbon atoms with olefinically unsaturated acids, preferably (meth)acrylic acid. The polyols can be selected from the same group as the compounds A3 supra, where an additional modification can consist in using reaction products of the polyols A3 with ethylene oxide and/or propylene oxide to yield ethoxylated or propoxylated or mixed alkoxylated polyols. Advantageously the water-compatible (poly)ester (meth)acrylates of the invention are different from the specific esters of polyols B1 and compounds C as described supra.

Suitable water-compatible (poly)ester (meth)acrylates can also be obtained by reacting a hydroxyl group-containing polyester backbone with (meth)acrylic acid, or by reacting a carboxyl group-containing polyester backbone with a hydroxyalkyl (meth)acrylate such as for example 2-hydroxyethyl acrylate, 2- or 3-hydroxypropyl acrylate, etc. or with glycidyl methacrylate. The (poly)ester backbone can be obtained in a conventional manner by polycondensation of at least one mono- and/or polyhydroxy alcohol, such as ethylene glycol, propylene glycol, butanediol, neopentyl glycol, hexanediol, trimethylolpropane, bisphenol A, pentaerythritol, etc, or/and the ethoxylates and/or propoxylates thereof, with at least one mono- and/or polycarboxylic acid such as fatty acids, adipic acid, phthalic acid, isophthalic acid, terephthalic acid, trimellitic acid, etc, or their corresponding anhydride. By using unsaturated compounds for the polyester synthesis, such as for example fumaric acid, maleic acid, itaconic acid, etc., polyesters bearing both (meth)acrylic and olefinic unsaturations in the polymer chain, can be obtained. In addition polylactones can be used as polyester backbone. For example poly(ε-caprolactone) obtained by ring-opening polymerization of ε-caprolactone, optionally in the presence of one or more polyhydroxy alcohol, can be used. Suitable for use in the composition of the present invention are for example those that have been commercialized under the names of EBECRYL®450, EBECRYL®800, EBECRYL®810, EBECRYL®830, EBECRYL®851 and EBECRYL®852.

Also suited are water-soluble (poly)ester (meth)acrylates such as those prepared from a (meth)acrylated OH functionalized compound and an anhydride (such as EBECRYL®770), or such as the esterification products of a water-soluble polyester polyol that comprises a polyethylene glycol segment and/or at least one pendant hydrophilic group with (meth)acrylic acid. By hydrophilic group is meant to designate a group that is either ionic, such as for example a carboxylate or sulfonate group, or that becomes ionic after reaction with a neutralizing agent forming a salt, such as a carboxylic acid, sulfonic acid, or an amino group. Water-soluble polyester polyols have been described for example in U.S. Pat. No. 5,006,598 and WO 94/28043.

More types of suitable water-soluble (meth)acrylates are described in WO 2009/115489. The following may e.g. be used: epoxy (meth)acrylates, polyether (meth)acrylates and mixtures thereof, especially those comprising at least 2 (meth)acrylate groups. More preferred are polyether (meth)acrylates, especially the (meth)acrylates of alkoxylated low molecular weight polyols. By low weight polyols is meant to designate polyols comprising at least 2 hydroxyl functions and having a molecular weight of less than 400, such as glycerol, trimethyolpropane, di-trimethylolpropane, pentaerythritol, di-pentaerythritol and bisphenols. Alkoxylated polyols having an equivalent ratio of oxygen to carbon of at least 0.2, preferably of at least 0.25 and more preferably of at least 0.33, are particularly preferred. Particularly preferred are (meth)acrylates of ethoxylated polyols, especially glycerol. Suitable products include those commercialized under the name of EBECRYL®11, EBECRYL®12, EBECRYL®13 and EBECRYL®2047.

Yet another example of suitable water-soluble (meth) acrylates are the styrene/maleic anhydride copolymers partially esterified with hydroxy alkyl (meth)acrylates (e.g., hydroxyethyl acrylate, hydroxyethyl methacrylate, hydroxybutyl acrylate, hydroxybutyl methacrylate) and a medium chain-length aliphatic alcohol (e.g., n-propanol, n-butanol, amyl alcohol, isoamyl alcohol, and the like) as described in EP1792956B1.

Preferred olefinically unsaturated compounds (2) according to the invention are (poly)urethane (meth)acrylates, (poly)ester (meth)acrylates and/or epoxy (meth)acrylates. Particularly preferred are the acrylated forms thereof.

Most preferred are (poly)urethane (meth)acrylates and/or epoxy (meth)acrylates, and especially acrylated forms thereof. These compounds can be used alone or in combinations with any other olefinically unsaturated water-dispersible, water-soluble compound and/or water-compatible compound according to the invention as described above.

In an embodiment of the invention, the composition of the invention comprises at least one olefinically unsaturated compound (2) selected from water-dispersible compounds (21) and/or water-soluble compounds (22), and, optionally, at least one water-compatible olefinically unsaturated compound (23) as described above.

In yet another embodiment of the invention, the composition of the invention comprises at least one olefinically unsaturated compound (2) which is water-compatible (23), and, optionally, at least one olefinically unsaturated compound (2) which is selected from water-dispersible compounds (21) and/or water-soluble compounds (22) as described above.

The present invention also relates to a process for preparing a composition of the invention, said process comprising adding to at least one radiation curable aqueously dispersed alkyd or polyester resin composition (1) comprising an emulsifier D and the reaction product AC of a hydroxy functional polyester resin A and an olefinically unsaturated compound C which can be radically polymerised and which is attached to the polyester resin backbone by an ester linkage or a urethane linkage, which composition (1), optionally, additionally may contain an olefinically unsaturated compound B which can be radically polymerised;

at least one other olefinically unsaturated compound (2) selected from the group of: water-dispersible compounds (21); water-soluble compounds (22); and/or water-compatible compounds (23) that have a weight average molecular weight of at least 450 Dalton and are different from the reaction product AC.

There exist different preferred ways of adding the olefinically unsaturated compound (2) of the invention depending on the compound's nature.

In one preferred embodiment, the polyester or alkyd resin composition (1) is simply admixed (or blended) with at least one olefinically unsaturated compound (2) according to the invention. In the same or another preferred embodiment, at least one olefinically unsaturated compound (2) according to the invention is present in the polyester or alkyd resin composition (1).

The present invention accordingly relates to a process for preparing a composition of the invention, comprising mixing (or blending)

at least one radiation curable aqueously dispersed polyester resin composition (1) comprising: an emulsifier D and the reaction product AC of a hydroxy functional polyester resin A and an olefinically unsaturated compound C which can be radically polymerised and which is attached to the polyester resin backbone by an ester linkage or a urethane linkage, which composition (1), optionally, may additionally contain at least one olefinically unsaturated compound B which can be radically polymerized; with at least one other olefinically unsaturated compound (2) selected from the group of: water-dispersible compounds (21); water-soluble compounds (22); and/or water-compatible compounds (23) that have a weight average molecular weight of at least 450 Dalton and are different from the reaction product AC.

In a most general way, the polyester or alkyd resin composition (1) is obtained by adding to a hydroxy functional polyester or alkyd resin A an olefinically unsaturated compound C, which compound C has functional groups that react with the hydroxyl groups of A, reacting A and C, and dispersing the reaction product AC of A and C in the presence of an emulsifier D in water to form a homogeneous mixture. The polyester or alkyd resin composition (1) can additionally contain an olefinically unsaturated compound B.

Depending on the nature of the compound, compounds (2) according to the invention in said embodiment may be added per se, or may be provided as dispersions, emulsions or solutions in water or an aqueous solution. Water-compatible compounds (23) may be provided as dispersions or emulsions in water by adding a suitable emulsifier E. This emulsifier E can be the same as the emulsifier D, or can be different therefrom.

The polyester resin composition of the invention typically has a mass fraction of solids of from 45% to 75%. To avoid too high differences in mass fraction of solids, in an embodiment of the invention the polyester resin composition (1) is (further) diluted in water prior to admixing (or blending) with the at least one olefinically unsaturated compound (2) according to the invention.

Advantageously, the mass fraction of solids of the polyester or alkyd resin composition (1) is thereby reduced to a mass fraction of solids that differs in no more than 30%, preferably no more than 15%, typically no more than 5%, from the mass fraction of solids of the olefinically unsaturated compounds (2) according to the invention.

In said same or a different embodiment, the pH is adjusted so that the difference in pH between the polyester resin composition (1) and the olefinically unsaturated compounds (2) according to the invention is at most 5 units prior to admixing (or blending). Preferably the difference is at most 3 pH units, more preferably at most 2 pH units.

In general it is the pH of the polyester or alkyd resin composition (1) that is adjusted, more typically increased, but also the pH of the olefinically unsaturated compound (2) may be adjusted, e.g. be decreased. Possibly the pH of both is adjusted prior to admixing (or blending).

When present in the radiation curable aqueously dispersed polyester resin composition (1), the at least one olefinically unsaturated compound (2) according to the invention may be added to the reaction product AC in any stage, during or after its preparation. Preferably this compound (2) is added to the reaction product AC (and where present B) prior to dispersion in water, more preferably prior to adding of the emulsifier D, permitting the use of a single emulsifier.

The present invention therefore also relates to a process for preparing a composition of the invention, comprising a) mixing the reaction product AC of a hydroxy functional polyester resin A and an olefinically unsaturated compound C which can be radically polymerised and which is attached to the polyester resin backbone by an ester linkage or a urethane linkage, with at least one other olefinically unsaturated compound (2) selected from the group of: water-dispersible compounds (21); water-soluble compounds (22); and/or water-compatible compounds (23) that have a weight average molecular weight of at least 450 Dalton and are different from the reaction product AC, b) adding thereto at least one emulsifier D under stirring until a homogeneous mixture is obtained, followed by c) dispersion in water to obtain a stable emulsion. A dispersion can be obtained by adding the compounds to water or by adding water to the compounds.

The olefinically unsaturated compound (2) usually is a water-compatible compound (23) as described above. Yet, also water-dispersible compounds (21) and/or water-soluble compounds (22) according to the invention may be added this way, preferably as such (i.e. as compounds per se).

The reaction product AC typically is obtained by a1) mixing in a reaction vessel a fatty acid A1 having from 8 to 24 carbon atoms, a polyhydric aliphatic alcohol A3 having at least three hydroxyl groups, and an aromatic, cycloaliphatic or linear or branched aliphatic carboxylic acid A4 having at least two carboxyl groups, or the anhydride thereof, and optionally, an aliphatic or aromatic monocarboxylic acid A2 having at least two carbon atoms and not more than seven carbon atoms, and optionally, an oil A5 which is preferably an unsaturated oil, wherein the amounts and kinds of the educts are chosen in a way to ensure a stoichiometric excess of hydroxyl groups in the mixture of educts, a2) heating the mixture thus obtained to a temperature of from 14° C. to 250° C. under removal of water, to provide a hydroxy functional polyester resin A, a3) adding an olefinically unsaturated compound C that is reactive with hydroxyl groups of A under formation of a chemical bond of a group which is an ester group or a urethane group, and heating the mixture of A and C to effect a reaction and formation of the said chemical bonds.

Optionally, the polyester resin composition (1) can further contain an olefinically unsaturated compound B as described above, which compound preferably is made in situ. In said case the polyester resin A of step a1) is mixed with a polyol B1 before reaction of step a3) with the olefinically unsaturated compound C.

The present invention also relates to a composition obtained (or obtainable) by any of the above methods.

Preferably the mass fraction of solids of the polyester or alkyd resin composition (1) to the olefinically unsaturated compounds (2) according to the invention ranges from 95/5 to 50/50. The radiation curable aqueous coating compositions according to the invention are typically formulated to coating compositions by addition of appropriate additives, such as photoinitiators (for UV curing), biocides, pigments, dyestuffs, fillers, levelling, anti-settling and flow additives.

Besides compounds (1) and (2), the composition of the invention may thus also contain additives (3). Especially when used for making inks, pigments and/or colorants may be added to the composition.

The composition according to the invention generally have a mass fraction of total solids defined as the total content of compounds (1), (2), and/or (3) and/or pigments, of at most 80%, preferably at most 50%. Typically the mass fraction of total solids in the composition of the invention is at least 5%, preferably at least 10%. Most typically the mass fraction of total solids in the composition of the invention is between 20% and 60%.

The composition according to the invention usually contains from 20% to 95%, by weight of water, more preferably between 40% and 80%, by weight of water.

The compositions of the invention can be used, i.a. as paints, inks, (laminating) adhesives and coatings, and lend themselves particularly well to coat and/or impregnate paper, cardboard, wood or wood materials, fibers (e.g. glass), as well as plastics and metal.

An aspect of the invention as such concerns a paint, coating, (laminating) adhesive or ink prepared from a composition according to the invention.

Another aspect of the invention as such concerns a paint, coating, (laminating) adhesive or ink comprising a composition according to the invention.

The compositions of the invention can be cured by radiation, optionally followed by air drying.

When cured by ultraviolet irradiation, this is typically done in the presence of photoinitiator. Usually from 0.5 to 12% by weight of photoinitiator may be added to the composition of the invention. The compositions can also be cured by electron-beam irradiation, allowing the use of compositions free of photoinitiator.

Depending on the resin composition, one can obtain systems with good reactivity, hardness and chemical resistance, abrasion resistance, scratch resistance, combined with adhesion, and in the case of wood, good wood wetting ("Anfeuerung"). This allows to make formulations which can be used both as primers, sealers and as topcoat on substrates such as wood. This is particularly useful for spray applications on furniture eliminating the need for more than one spray equipment.

The present invention further provides a method of use of the (of any) composition according to the invention, comprising adding one or more of additives selected from the group of photoinitiators, pigments, colourants, dispersing agents, flow additives, thickening agents, matting agents, and adhesion promoters, to the polyester resin composition according to the invention, mixing and homogenising the mixture thus obtained, to obtain a paint, (laminating) adhesive, coating or ink and applying the said paint, (laminating) adhesive, coating or ink to the surface of a substrate in the form of a wet film, drying or flushing off at least a part of the water and optionally, other volatile components comprised in the said film, and exposing the coated substrate to high energy radiation sufficient to cure the film.

According to a specific preferred embodiment, siccatives are additionally used as additives, and the coated substrate is concurrently with, or after, the irradiation, subjected to air oxidation to provide air drying.

Yet another aspect of the invention concerns an article coated, either partially or entirely, with a coating composition of the invention.

The following examples are provided to further explain the invention, without limiting it. In the examples, as well as in the specification, the following definitions are used:

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

Unless explicitly stated otherwise, all quantities having the unit "%" ("g/(100 g)", or "cg/g"), particularly a concentration or strength of a solution or dispersion, are mass fractions, calculated by dividing the mass of the dissolved or dispersed or admixed substance, by the mass of the solution or dispersion or mixture.

Dynamic viscosity is measured at 25° C. with a shear rate of 100 s$^{-1}$, using a cone and plate viscometer.

PREPARATIVE EXAMPLES

Vinyl-Functional Alkyd Resin

Example R1—Mixture of Vinyl Functional Alkyd Resin and Vinyl Functional Polyol

In a standard synthetic resin reactor, 62 kg of benzoic acid, 105 kg of coconut oil fatty acid, 87 kg of pentaerythritol, and 70 kg of phthalic anhydride were heated to 230° C. Azeotropic distillation at 230° C. using toluene as azeotrope former and subsequent dilution to a mass fraction of solids 80% with toluene yielded 373 kg of an alkyd resin having an acid number of 3.0 mg/g, a dynamic viscosity, diluted with toluene to a mass fraction of solids of 50%, of 45 mPa·s, and a hydroxyl number of 120 mg/g. The alkyd resin was mixed at 90° C. with 87 kg of glycerol propoxylate having an average molar mass of 355 g/mol, 2.5 kg of p-toluene sulfonic acid, and 1.2 kg hydroquinone monomethyl ether were added as catalyst and inhibitor, respectively. After addition of 78.5 kg of acrylic acid the reaction mass was heated to 125° C. while a flow of 3 m$^3$/h of lean air with an oxygen content of 7% was bubbled through the reactor. At 125° C., azeotropic distillation using toluene as azeotrope former was performed until an acid number of less than 30 mg/g was reached. Subsequent distillation under reduced pressure to remove the azeotrope former gave 445 kg of a product having a purity of 99.5%, an acid number of 10 mg/g, and a dynamic viscosity of 25 Pa·s.

Example R2—Vinyl Functional Alkyd Resin

As in example R1, 137 kg of cotton oil fatty acid, 87 kg of pentaerythritol, and 74 kg of phthalic anhydride were heated to 230° C. Azeotropic distillation at 230° C. using toluene as azeotrope former and subsequent dilution of the resulting resins to a mass fraction of solids of 80% with toluene yielded 373 kg of an alkyd resin having an acid number of 1.5 mg/g, a dynamic viscosity, measured on a solution diluted with toluene to a mass fraction of solids of 50%, of 40 mPa·s, and a hydroxyl number of 210 mg/g. Into this alkyd resin, 2.5 kg of p-toluene sulphonic acid and 1.2 kg hydroquinone monomethyl ether were added as catalyst and inhibitor, respectively. After adding 85 kg of acrylic acid the reaction mass was heated to 125° C. while a flow of 3 m$^3$/h of lean air with an oxygen content of 7% was bubbled through the reactor. At 125° C., azeotropic distillation using toluene as azeotrope former was performed until an acid number of less than 30 mg/g was reached. Subsequent distillation under reduced pressure to remove the toluene and acrylic acid in excess gave 340 kg of a product having a purity of 99.0%, an acid number of 12 mg/g and a dynamic viscosity of 13 Pa·s.

Example R3—Vinyl Functional Alkyd Resin

In a standard synthetic resin reactor, 210 kg of soybean oil and 55 kg of pentaerythritol were transesterified at 265° C. using 0.03 g of lithium hydroxide as catalyst, and after adding 82 kg of phthalic anhydride at 200° C., the reaction mixture was heated to 230° C. Azeotropic distillation at 230° C. using toluene as azeotrope former and subsequent dilution to a mass fraction of solids of 80% with toluene yielded 422 kg of an alkyd resin having an acid number of 5.0 mg/g, a dynamic viscosity measured on a 60% strength solution in toluene, of 250 mPa·s, and a hydroxyl number of 90 mg/g. This alkyd resin was mixed at 90° C. with 2.5 kg of p-toluene sulphonic acid and 1.2 kg of hydroquinone monomethyl ether, as catalyst and inhibitor, respectively. After adding 42.2 kg of acrylic acid the reaction mass was heated to 125° C. while a flow of 3 m$^3$/h of lean air with an oxygen content of 7% was bubbled through the reactor. At 125° C., azeotropic distillation using toluene as azeotrope former was performed until acid number of less than 30 mg/g was reached. Subsequent distillation under reduced pressure to remove the toluene and excess of acrylic acid gave 374 kg of a product having a purity of 99.0%, an acid number of 9 mg/g and a dynamic viscosity of 42 Pa·s.

Example R4—Vinyl Functional Alkyd Resin 34.1 kg of toluene diisocyanate were reacted with 23 kg of hydroxyethyl acrylate and 0.02 kg of dibutyltin dilaurate as catalyst and 0.09 kg of butylated hydroxytoluene as stabiliser. Reaction was done at a temperature not exceeding 50° C. and resulted in a product with a specific isocyanate group content of 3.44 mmol/g (corresponding to a mass fraction of isocyanate groups, M=42.02 g/mol, of 14.4%). This product is referred to as M1.

100 kg of an alkyd resin as prepared in example R1 with a mass fraction of solids of 100% having a hydroxyl number of 110 mg/g were mixed with 44.8 kg of glycerol propoxylate tri-acrylate and 0.05 kg of dibutyltin dilaurate as catalyst and 0.05 kg of butylated hydroxytoluene as stabiliser. This mixture is referred to as M2.

Components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 22 kg of glycerol propoxylate tri-acrylate resulted in a urethane acrylate product with a dynamic viscosity at 60° C. of 15 Pa·s.

Example R5—Vinyl Functional Alkyd Resin 43.6 kg of isophorone diisocyanate were reacted with 23 kg of hydroxyethyl acrylate and 0.02 kg of dibutyltin dilaurate as catalyst and 0.10 kg of butylated hydroxytoluene as stabiliser. Reaction was done at a temperature not exceeding 50° C. and resulted in a product with a specific isocyanate group content of 2.96 mmol/g (corresponding to a mass fraction of isocyanate groups, M=42.02 g/mol, of 12.4%). This reaction product is referred to as M1. 100 kg of an alkyd resin as prepared in example R1 with a mass fraction of solids of 100% having a hydroxyl number of 110 mg/g were mixed with 47.5 kg of glycerol propoxylate tri-acrylate and 0.05 kg of dibutyltin dilaurate as catalyst and 0.05 kg of butylated hydroxytoluene as stabiliser. This mixture is referred to as M2.

Both components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 24 kg of glycerol propoxylate tri-acrylate resulted in a urethane acrylate product with a dynamic viscosity at 60° C. of 10 Pa·s.

Example R6—Vinyl Functional Alkyd Resin 34.1 kg of toluene diisocyanate were reacted with 26 kg of hydroxypropyl acrylate and 0.02 kg of dibutyltin dilaurate as catalyst and 0.1 kg of butylated hydroxytoluene as stabiliser. Reaction was done at a temperature not exceeding 50° C. and resulted in a product with a specific isocyanate group content of 3.29 mmol/g (corresponding to a mass fraction of isocyanate groups, M=42.02 g/mol, of 13.8%). This product is referred to as M1.

100 kg of an alkyd resin as prepared in example R1 with a mass fraction of solids of 100% having a hydroxyl number of 110 mg/g were mixed with 45.6 kg of glycerol propoxylate tri-acrylate and 0.05 kg of dibutyltin dilaurate as catalyst and 0.05 kg of butylated hydroxytoluene as stabiliser. This mixture is referred to as M2.

Both components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 23 kg of glycerol propoxylate tri-acrylate resulted in a urethane acrylate product with a dynamic viscosity at 60° C. of 15 Pa·s.

Example R7—Vinyl Functional Alkyd Resin

In a standard synthetic resin reactor, 410 kg of linseed oil, 8 kg of tall oil fatty acid, 70 kg of glycerol and 24 kg of pentaerythritol were transesterified at 260° C. using 0.10 kg of lithium hydroxide as catalyst, and after adding 135 kg of phthalic anhydride at 180° C., the reaction mixture was heated to 230° C. under azeotropic distillation. When an acid value of <3 mg/g was achieved, distillation under reduced pressure was performed at 230° C. and yielded 631 kg of a solvent-free alkyd resin having an acid number of 0.5 mg/g, a dynamic viscosity measured on a 60% strength solution in toluene, of 100 mPa·s, and a hydroxyl number of 100 mg/g.

100 kg of this alkyd resin were mixed with 52 kg of the reaction product of toluene di-isocyanate and hydroxyethyl acrylate (as described in example R6) and heated to 85° C. Maturation was done at 85° C. and resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 17 kg of glycerol propoxylate tri-acrylate resulted in a urethane acrylate product with a dynamic viscosity at 60° C. of 20 Pa·s.

Example R8—Vinyl Functional Alkyd Resin 34.1 kg of toluene diisocyanate were reacted with 74 kg of di-trimethylolpropane triacrylate and 0.02 kg of dibutyltin dilaurate as catalyst and 0.1 kg of butylated hydroxytoluene as stabiliser. Reaction was done at a temperature not exceeding 50° C. and resulted in a product with a specific isocyanate group content of 1.81 mmol/g (corresponding to a mass fraction of isocyanate groups, M=42.02 g/mol, of 7.6%). This product is referred to as M1.

100 kg of an alkyd resin as prepared in example R1 with a mass fraction of solids of 100% having a hydroxyl number of 110 mg/g were mixed with 59.1 kg of glycerol propoxylate tri-acrylate and 0.06 kg of dibutyltin dilaurate as catalyst and 0.06 kg of butylated hydroxytoluene as stabiliser. This mixture is referred to as M2.

Both components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 630 kg of glycerol propoxylate tri-acrylate resulted in a urethane acrylate product with a dynamic viscosity at 60° C. of 62.8 Pa·s.

Emulsifier

Example E1

In a standard synthetic resin reactor, 476 kg of sunflower oil fatty acid, 176 kg of sorbitol, 335 kg of tetrahydrophthalic acid anhydride, and 2 kg of dibutyltin dilaurate as catalyst were heated to 180° C., 820 kg of monomethoxy polyethylene glycol having a number-average molar mass of 750 g/mol were added, and the mixture was heated further to 230° C. Azeotropic distillation at 230° C. using xylene as azeotrope former and subsequent distillation under reduced pressure to remove the azeotrope former gave 1850 kg of a product having a purity of 100%, an acid number of 3 mg/g and a dynamic viscosity, diluted with water to a mass fraction of solids of 45%, of 7500 mPa·s.

Example E2

27.2 kg of linseed oil and 7.2 kg of glycerol were transesterified at 265° C. with 5 g of lithium hydroxide as catalyst until the reaction mass was infinitely soluble in ethanol. After cooling to 100° C., 21.2 kg of hexahydrophthalic acid anhydride and 46.4 kg of monomethoxy polyethylene glycol having a number-average molar mass of 750 g/mol were charged, 0.2 kg of triethyl amine were added as catalyst and the reaction mixture was heated further to 230° C. Azeotropic distillation at 230° C. using xylene as azeotrope former and subsequent distillation under reduced pressure to remove the xylene gave 100 kg of a product having an acid number of 1.5 mg/g and a dynamic viscosity, diluted with water to a mass fraction of solids of 50%, of 7200 mPa·s.

Example E3

As in Example E, 15.8 kg of coconut oil fatty acid, 9.6 kg of glycerol, 19.1 kg of tetrahydrophthalic acid anhydride, and 0.09 kg of triethylamine as catalyst were heated to 180° C., 55.3 kg of monobutoxy polyethylene glycol having a number-average molar mass of 750 g/mol were added, and the mixture was heated to 230° C. Azeotropic distillation at 230° C. using xylene as azeotrope former and subsequent distillation under reduced pressure to remove the azeotrope former gave 100 kg of a product having a purity of 100%, and an acid number of 8 mg/g. The residual carboxyl functions were reacted with 3.7 kg of neodecanoic acid oxiranylmethyl ester to an acid number of less than 1.0 mg/g. Dynamic viscosity of the product, measured on a 50% strength dispersion in water, was 5500 mPa·s.

Preparative Examples 1 to 12

The emulsions were prepared in the proportions and under the conditions stated in Table 1. Component E was charged to a standard synthetic resin reactor with an appropriate stirrer and the preheated component R (temperature of addition $T_R$) was added with stirring over the course of 60 minutes. Following homogenisation for one hour, the product was diluted to the desired application viscosity corresponding to a mass fraction of solids of from 63% to 67% in the emulsion by adding desalinated water in portions.

All emulsions gave films which corresponded to the solvent-containing systems in terms of drying properties and film quality. The stability of the emulsions was determined by storage at 40° C. and 60° C. and also 3 freeze-thaw cycles at −10° C./25° C. All emulsions of the invention were still satisfactory after 240 hours (60° C.) and after 2160 hours (40° C.). After 3 freeze-thaw cycles, there were no significant changes in the emulsions.

TABLE 1

Preparation of the emulsions, Preparative examples 1 to 8

| Ex. | Component R | | | Component E | | Emulsion | |
|---|---|---|---|---|---|---|---|
| | Type | $w_s$/% | $T_R$/° C. | Type | $w_s$/% | $w_s$/% | $\eta$/mPa · s |
| 1 | R1 | 90 | 60 | E1 | 10 | 65 | 1320 |
| 2 | R2 | 90 | 35 | E1 | 10 | 65 | 720 |
| 3 | R3 | 88 | 60 | E1 | 12 | 66 | 150 |
| 4 | R1 | 85 | 50 | E2 | 15 | 66 | 1210 |
| 5 | R2 | 85 | 35 | E2 | 15 | 64 | 620 |
| 6 | R3 | 88 | 60 | E2 | 10* | 67 | 1180 |
| 7 | R1 | 88 | 60 | E3 | 10* | 65 | 1160 |
| 8 | R2 | 85 | 35 | E3 | 15 | 63 | 970 |
| 8bis | R1 | 84 | 60 | E4 | 8** | 65 | 223 |

*oleyl alcohol ethoxylate, having a mass fraction of oxyethylene unit of approximately 80%, was further added in an amount corresponding to a mass fraction of 2% of the oleyl alcohol ethoxylate in the solids part of the emulsion
**E4 is an oxide/polypropylene oxide block copolymer emulsifier. Dipropylene glycol methyl ether was further added in an amount corresponding to a mass fraction of 6% of the dipropylene glycol methyl ether in the solids part of the emulsion
$w_s$: mass fraction of solids
$\eta$: dynamic viscosity Preparative Examples 9 to 12

Further emulsions were prepared using the proportions and conditions as stated in table 2. Component E was first charged to a standard synthetic resin reactor with an appropriate stirrer and the preheated component R (temperature of addition $T_R$) was added with stirring over the course of 60 minutes. Following homogenisation for one hour, the product was diluted to the desired application viscosity corresponding to a mass fraction of solids of from 63% to 67% in the emulsion by adding desalinated water in portions.

TABLE 2

Preparation of the emulsions, Preparative examples 9 to 12

| Ex. | Component R | | Component E | | Emulsion | |
|---|---|---|---|---|---|---|
| | Type | $w_s$/% | Type | $w_s$/% | $w_s$/% | $\eta$/mPa·s |
| 9 | R5 | 100 | E3 | 55.0 | 64.4 | 1100 |
| 10 | R6 | 100 | E3 | 55.0 | 64.8 | 1215 |
| 11 | R7 | 100 | E3 | 55.0 | 63.3 | 2145 |
| 12 | R8 | 100 | E3 | 55.0 | 63.0 | 3240 |

$w_s$: mass fraction of solids
$\eta$: dynamic viscosity

In example 11, a water-emulsifiable combination siccative (comprising mass fractions of each of ca. 5% cobalt, ca. 0.22% lithium, and ca. 7.5% zirconium, free from nonylphenol ethoxylate) is added, to provide a mass ratio of metals to binder solids of ca. 2%.

Examples 13 to 14

An emulsion according to example 7 above was diluted in desalinated water to achieve a final mass fraction of solids of 40% and 35% respectively as indicated in Table 3 below. This was done by slowly adding the indicated amount of water at room temperature over a period of 30 minutes, while continuously stirring at 100 RPM. Amounts: parts by weight.

TABLE 3

Preparation of the dilutions: Examples 13 and 14

| | Example 13 | Example 14 |
|---|---|---|
| Emulsion of Example 7 | 100 | 100 |
| H20 | 62 | 85 |
| Mass fraction of solids | 40% | 35% |

Hereby the resins of Examples 13 and 14 obtain the same mass fraction of solids as the respective water-dispersible (poly)urethane (meth)acrylates with which they were subsequently blended (UCECOAT®7177 and UCECOAT®7571 respectively).

Formulation Examples F1-F6 and CE1-CE2

Then blends were prepared by adding the appropriate amount of water-dispersible (poly)urethane (meth)acrylates to the materials of Table 3. This was done at room temperature over a period of 30 minutes under continuous stirring at 100 RPM.

To these mixtures, 1.5% of a photo-initiator blend (composed of equal masses of benzophenone and CPK (1-hydroxy-cyclohexyl-phenyl ketone) and 2% of a mixture of equal masses of a polyether (poly)urethane thickener (ADDITOL® VXW 8460, Cytec Surface Specialties Austria GmbH) and desalinated water (50/50) are added. The formulated composition was applied on opacity charts (Leneta Company—USA) or on glass, depending on the tests, and dried in an oven at 80° C. for five minutes. The radiation curing was effected by exposing the coated and dried samples to a mercury ultra-violet lamp with a power of 80 W/cm at different conveyor speeds. The samples were evaluated for reactivity, hardness and stain resistance. Formulations according to the invention (F1 to F6) were tested in comparison to CE1 and CE2, i.e., formulations based on resins according to Examples 13-14 without a compound (2) according to the invention.

Compositions of the formulations tested are provided in Table 4. Amounts: parts by weight.

TABLE 4

Composition of the formulations tested

| | CE1 | CE2 | F1 | F2 | F3 | F4 | F5 | F6 |
|---|---|---|---|---|---|---|---|---|
| Resin of Example 13 | 100 | | 80 | 50 | 20 | | | |
| Resin of Example 14 | | 100 | | | | 80 | 50 | 20 |
| UCECOAT ®7177 | | | 20 | 50 | 80 | | | |
| UCECOAT ®7571 | | | | | | 20 | 50 | 80 |
| ADDITOL ® BCPK | 1.5 | 1.5 | 1.5 | 1.5 | 1.5 | 1.5 | 1.5 | 1.5 |
| ADDITOL ® VXW 8460/H20 - 1/1* | 2 | 2 | 2 | 2 | 2 | 2 | 2 | 2 |

*ADDITOL ® VXW 8460 is a thickener

The following test methods were used in the evaluation:

Reactivity was measured on Leneta paper by applying 30-40 g of wet coating on the substrate. The reactivity is expressed as the speed of the conveyor in m/min at which talc, that is put on the coating surface, can be brushed away without leaving traces on the surface. At this speed the number of acetone double rubs (ADR) are measured. The figures in the table are the number of ADR on the cured coating before visual damage of the coating is observed.

Persoz hardness is measured on a glass plate. 120µ of wet coating is applied on the glass plate and cured at the talc speed as described above.

The instrument consists of a pendulum which is free to swing on two balls resting on the coated test panel. The time in seconds for the amplitude of the swing to decrease from 12 to 4 degrees is measured.

Stain resistance was measured on Leneta paper by applying 50µ of wet coating and drying and curing the coating at talc speed as described above. Several liquid stains are put on the cured coating and protected with a watch glass. After a contact time of 1 hour the stains are wiped away, first dry and then with water and detergent. Visual evaluation of the coating surface is done and reported on a scale from 0 to 5 as follows:

5=No visible change

4=Very slight change in color or gloss

3=Slight change in color and/or gloss but the surface structure is not damaged.

2=Strong change in color and/or gloss but the surface structure is not damaged.

1=Strong marks and surface structure is damaged.

0=Surface structure completely damaged.

The results are compiled in Tables 5 to 7

TABLE 5

| Reactivity | CE1 | CE2 | F1 | F2 | F3 | F4 | F5 | F6 |
|---|---|---|---|---|---|---|---|---|
| Talc | 5 m/min | 5 m/min | 10 m/min | 10 m/min | 15 m/min | 10 m/min | 15 m/min | 15 m/min |
| ADR* | 20 | 20 | 25 | 40 | 50 | 21 | 25 | 50 |

*acetone double rubs

TABLE 6

| Persoz Hardness | CE1 | CE2 | F1 | F2 | F3 | F4 | F5 | F6 |
|---|---|---|---|---|---|---|---|---|
| H* | 65 | 65 | 136 | 193 | 259 | 168 | 232 | 298 |

*Hardness, in seconds

TABLE 7

| Stain resistance | | | | | | | | |
|---|---|---|---|---|---|---|---|---|
| Stains | CE1 | CE2 | F1 | F2 | F3 | F4 | F5 | F6 |
| NH3—1% | 5 | 5 | 5 | 5 | 5 | 5 | 5 | 5 |
| NH3—10% | 4 | 4 | 4 | 5 | 5 | 5 | 5 | 5 |
| Red wine | 5 | 5 | 5 | 5 | 5 | 5 | 5 | 5 |
| Mustard | 0 | 0 | 2 | 3 | 3 | 2 | 4 | 5 |
| Ethanol 50% | 5 | 5 | 5 | 5 | 5 | 5 | 5 | 5 |
| Acetone | 5 | 5 | 5 | 5 | 5 | 5 | 5 | 5 |
| IPA | 5 | 5 | 5 | 5 | 5 | 5 | 5 | 5 |
| Coffee | 4 | 4 | 5 | 5 | 5 | 5 | 5 | 5 |
| Eosine | 0 | 0 | 1 | 2 | 3 | 3 | 5 | 5 |
| Average stains | 3.7 | 3.7 | 4.1 | 4.4 | 4.6 | 4.4 | 4.9 | 5.0 |

The above results clearly show the influence of the addition of water-dispersible compounds (21) according to the invention. Talc reactivity increases with increasing amount of both (poly)urethane (meth)acrylates as well as the number of ADR at the talc speed.

Persoz hardness also increases with increasing amount of the (poly)urethane (meth)acrylates. The difference between F1-3 and F4-6 reflects the difference in hardness between the 2 types of (poly)urethane (meth)acrylates used.

Same is true for the stain resistance. The stain resistance improves with the addition of the (poly)urethane (meth)acrylates and this improvement is stronger with the addition of UCECOAT® 7571 as can be seen for the mustard and Eosine resistance.

Films prepared from formulations F2-F3 and F5-F6 were tack-free before cure (after water evaporation).

Formulation Examples F7-F12

Blends were also prepared by adding water-compatible compounds (23) at room temperature under continuous stirring at 2500 rpm to the emulsion of example 7. The water-compatible acrylated resins were added using a high performance disperser (Ultra Turrax).

Performances of compositions according to the invention were compared to those of the emulsion of Example 7 (Ref).

TABLE 8

| Composition of the Formulations tested. Amounts: parts by weight | | | | | | | |
|---|---|---|---|---|---|---|---|
| | Ref. | F7 | F8 | F9 | F10 | F11 | F12 |
| Emulsion example 7 | 100 | 93 | 86 | 93 | 86 | 93 | 86 |
| EBECRYL ®220 | | 7 | 14 | | | | |
| EBECRYL ®450 | | | | 7 | 14 | | |
| EBECRYL ®600 | | | | | | 7 | 14 |
| ADDITOL ®BCPK | 3.5 | 3.5 | 3.5 | 3.5 | 3.5 | 3.5 | 3.5 |

EBECRYL ®220: Aromatic (Poly)Urethane Hexaacrylate
EBECRYL ®450: Fatty Acid Modified Polyester Hexaacrylate
EBECRYL ®600: Bisphenol-A Epoxy Diacrylate These formulations were evaluated for reactivity, Persoz hardness and stain resistance according to the methods previously described. The results are compiled in Tables 9 to 11.

TABLE 9

| Reactivity | Ref. | F7 | F8 | F9 | F10 | F11 | F12 |
|---|---|---|---|---|---|---|---|
| Talc (m/min) | 5 | 10 | 15 | 10 | 15 | 15 | 15-20 |
| ADR | 20 | 16 | 30 | 35 | 25 | 20 | 25 |

TABLE 10

| Persoz hardness | Ref. | F7 | F8 | F9 | F10 | F11 | F12 |
|---|---|---|---|---|---|---|---|
| Hardness (s) | 70 | 102 | 154 | 97 | 111 | 111 | 137 |

TABLE 11

| Stain resistance | | | | | | | |
|---|---|---|---|---|---|---|---|
| Stains | Ref. | F7 | F8 | F9 | F10 | F11 | F12 |
| NH3—1% | 5 | 5 | 5 | 5 | 5 | 5 | 5 |
| NH3—10% | 5 | 5 | 5 | 5 | 5 | 5 | 5 |
| Red wine | 5 | 5 | 5 | 5 | 5 | 5 | 5 |
| Mustard | 1 | 2.5 | 3 | 2.5 | 3 | 2.5 | 3 |
| EtOH 50% | 5 | 5 | 5 | 5 | 5 | 5 | 5 |
| Acetone | 5 | 5 | 5 | 5 | 5 | 5 | 5 |
| IPA | 5 | 5 | 5 | 5 | 5 | 5 | 5 |
| Coffee | 3.5 | 4 | 4.5 | 4.5 | 4.5 | 4.5 | 4.5 |
| Eosine | 0 | 3 | 3 | 2.5 | 3 | 2.5 | 3 |
| Average stains | 3.8 | 4.4 | 4.5 | 4.4 | 4.5 | 4.4 | 4.5 |

These results clearly show the impact of adding water-compatible acrylated compounds (23) according to the invention. Reactivity, hardness and stain resistance are improved by adding these water-compatible compounds. The level of improvement is a function of the amount and the type of water-compatible compound added.

The above results mimic the presence of water-compatible compounds (23) according to the invention in an aqueously dispersed polyester resin composition (1).

The invention claimed is:

1. A radiation curable aqueous coating composition comprising:
   from 1 to 99% by weight, relative to a total weight of (1) and (2), of at least one radiation curable aqueously dispersed polyester resin composition (1) comprising an emulsifier D and a reaction product AC of a hydroxy functional polyester resin A and an olefinically unsaturated compound C which can be radically polymerised and which is attached to the polyester resin backbone by an ester linkage or a urethane linkage, wherein the emulsifier D is compatible with the reaction product AC and is the polyesterification product of a fatty acid D1, a polyhydric alcohol D2 having at least three hydroxyl groups per molecule, a carboxylic acid D3 or its anhydride, and a monoalkoxy polyalkylene glycol D4, and
   from 1 to 99% by weight, relative to the total weight of (1) and (2), of at least one other olefinically unsaturated compound (2) selected from the group consisting of (meth)acrylated (poly)urethanes, (meth)acrylated epoxies, (meth)acrylated polyesters, (meth)acrylated polyethers, partially esterified styrene/maleic anhydride copolymers, and mixtures or copolymers thereof that have a weight average molecular weight of at least 450 Dalton and are different from the reaction product AC.

2. The composition of claim 1, wherein a mass fraction of solids of the polyester resin composition (1) to the at least one other olefinically unsaturated compound (2) ranges from 95/5 to 50/50.

3. The composition of claim 1, wherein the polyester resin composition (1) additionally comprises at least one olefinically unsaturated compound B which can be radically polymerized.

4. The composition of claim 3, wherein the compound B is a reaction product of a polyol B1 and an olefinically unsaturated compound C which can be radically polymerized.

5. The composition of claim 1, wherein the olefinically unsaturated compound (2) has a weight average molecular weight of at least 600 Dalton.

6. The composition of claim 1, wherein compound C which can be radically polymerised is attached to the polyester resin backbone by an ester linkage.

7. The composition of claim 1, wherein compound C which can be radically polymerised is attached to the polyester resin backbone by a urethane linkage.

8. The composition of claim 1, wherein compound C is a (meth)acrylated compound.

9. The composition of claim 1 comprising, relative to the total weight of AC and D, from 3 to 30% by weight of the emulsifier D and from 70 to 97% by weight of the reaction product AC.

10. A process for preparing the composition of claim 1, said process comprising adding to
   at least one radiation curable aqueously dispersed polyester resin composition (1) comprising an emulsifier D and a reaction product AC of a hydroxy functional polyester resin A and an olefinically unsaturated compound C which can be radically polymerised and which is attached to the polyester resin backbone by an ester linkage or a urethane linkage, which composition (1), optionally contains an olefinically unsaturated compound B which can be radically polymerised, wherein the emulsifier D is compatible with the reaction product AC and where present, the olefinically unsaturated compound B, and wherein the emulsifier D is the polyesterification product of a fatty acid D1, a polyhydric alcohol D2 having at least three hydroxyl groups per molecule, a carboxylic acid D3 or its anhydride, and a monoalkoxy polyalkylene glycol D4;
   at least one other olefinically unsaturated compound (2) selected from the group consisting of (meth)acrylated (poly)urethanes, (meth)acrylated epoxies, (meth)acrylated polyesters, (meth)acrylated polyethers, partially esterified styrene/maleic anhydride copolymers, and mixtures or copolymers thereof that have a weight average molecular weight of at least 450 Dalton and are different from the reaction product AC.

11. The process of claim 10, comprising blending
   the polyester resin composition (1) with
   the olefinically unsaturated compound (2).

12. The process of claim 11, comprising a step of diluting the polyester resin composition (1) in water prior to blending with the olefinically unsaturated compound (2).

13. The process of claim 11, comprising a step of adjusting pH so that a difference in pH between the polyester resin composition (1) and the olefinically unsaturated compound (2) is at most 5 units prior to blending.

14. The process of claim 10, comprising
   a) mixing the reaction product AC of a hydroxy functional polyester resin A and an olefinically unsaturated compound C which can be radically polymerised and which is attached to the polyester resin backbone by an ester linkage or a urethane linkage, and, optionally the olefinically unsaturated compound B, with the olefinically unsaturated compound (2),
   b) adding thereto at least one emulsifier D under stirring until a homogeneous mixture is obtained, followed by
   c) dispersing in water to obtain a stable emulsion.

15. The process of claim 14, wherein the reaction product AC is obtained by
   a1) mixing in a reaction vessel, as starting materials, a fatty acid A1 having from 8 to 24 carbon atoms, a polyhydric aliphatic alcohol A3 having at least three hydroxyl groups, and an aromatic, cycloaliphatic or linear or branched aliphatic carboxylic acid A4 having at least two carboxyl groups, or an anhydride thereof, and optionally, an aliphatic or aromatic monocarboxylic acid A2 having at least two carbon atoms and not more than seven carbon atoms, and optionally, an oil A5, wherein the starting materials and amounts thereof are chosen in a way to ensure a stoichiometric excess of hydroxyl groups in a resulting mixture of the starting materials,
   a2) heating the mixture of the starting materials to a temperature of from 140° C. to 250° C. under removal of water, to provide a hydroxy functional polyester resin A,
   a3) adding the olefinically unsaturated compound C that is reactive with hydroxyl groups of A for formation of a chemical bond comprising a group which is an ester group or a urethane group, and heating a resulting mixture of A and C to effect a reaction and formation of the said chemical bonds.

16. The process of claim 15, wherein the polyester resin A is mixed with a polyol B1 before reaction of step a3) with the olefinically unsaturated compound C.

17. The process according to claim 15, wherein the oil A5 is an unsaturated oil.

18. A paint, coating, adhesive or ink prepared from the composition of claim 1.

19. A method of use of the composition of claim 1 comprising:
adding one or more of additives selected from the group consisting of photoinitiators, pigments, colourants, dispersing agents, flow additives, thickening agents, matting agents, and adhesion promoters, to the coating composition of claim 1,
mixing and homogenising a resulting mixture to obtain a paint, adhesive, coating or ink,
coating a surface of a substrate by applying the paint, adhesive, coating or ink to the surface of the substrate in the form of a wet film,
drying or flushing off at least a part of water comprised in the film, and
exposing the coated substrate to high energy radiation to cure the film.

20. The method of claim 19 wherein in addition to the one or more additives, siccatives are added as a further additive, and wherein the coated substrate is concurrently with, or after, the irradiation, subjected to air oxidation to provide air drying.

21. A radiation curable aqueous coating composition comprising:
from 1 to 99% by weight, relative to a total weight of (1) and (2), of at least one radiation curable aqueously dispersed polyester resin composition (1) comprising from 3 to 30% by weight of an emulsifier D and from 70 to 97% by weight of a reaction product AC consisting of a hydroxy functional polyester resin A and a (meth)acrylated compound C which can be radically polymerised and which is attached to the polyester resin backbone by an ester linkage or a urethane linkage, wherein the emulsifier D is compatible with the reaction product AC and is the polyesterification product of a fatty acid D1, a polyhydric alcohol D2 having at least three hydroxyl groups per molecule, a carboxylic acid D3 or its anhydride, and a monoalkoxy polyalkylene glycol D4, and
from 1 to 99% by weight, relative to the total weight of (1) and (2), of at least one other olefinically unsaturated compound (2) selected from the group consisting of (meth)acrylated (poly)urethanes, (meth)acrylated epoxies, (meth)acrylated polyesters, (meth)acrylated polyethers, partially esterified styrene/maleic anhydride copolymers, and mixtures or copolymers thereof that have a weight average molecular weight of at least 450 Dalton and are different from the reaction product AC.

22. A radiation curable aqueous coating composition comprising:
from 1 to 99% by weight, relative to a total weight of (1) and (2), of at least one radiation curable aqueously dispersed polyester resin composition (1) comprising an emulsifier D and a reaction product AC of a hydroxy functional polyester resin A and an olefinically unsaturated compound C which can be radically polymerised and which is attached to the polyester resin backbone by a urethane linkage, wherein the emulsifier D is compatible with the reaction product AC and is the polyesterification product of a fatty acid D1, a polyhydric alcohol D2 having at least three hydroxyl groups per molecule, a carboxylic acid D3 or its anhydride, and a monoalkoxy polyalkylene glycol D4, and
from 1 to 99% by weight, relative to the total weight of (1) and (2), of at least one other olefinically unsaturated compound (2) selected from the group consisting of water-dispersible compounds (21); water-soluble compounds (22); and water-compatible compounds (23) that have a weight average molecular weight of at least 450 Dalton and are different from the reaction product AC.

23. The composition of claim 22, wherein the at least one other olefinically unsaturated compound (2) is selected from the group consisting of (meth)acrylated (poly)urethanes, (meth)acrylated epoxies, (meth)acrylated acrylics, (meth)acrylated polyesters, (meth)acrylated polyethers, partially esterified styrene/maleic anhydride copolymers, and mixtures or copolymers thereof.

24. The composition of claim 22, wherein a mass fraction of solids of the polyester resin composition (1) to the at least one other olefinically unsaturated compound (2) ranges from 95/5 to 50/50.

25. The composition of claim 22, wherein the polyester resin composition (1) additionally comprises at least one olefinically unsaturated compound B which can be radically polymerized.

26. The composition of claim 22, wherein the olefinically unsaturated compound (2) has a weight average molecular weight of at least 600 Dalton.

27. The composition of claim 22, wherein compound C is a (meth)acrylated compound.

28. The composition of claim 22 comprising, relative to the total weight of AC and D, from 3 to 30% by weight of the emulsifier D and from 70 to 97% by weight of the reaction product AC.

* * * * *